Figure 1:
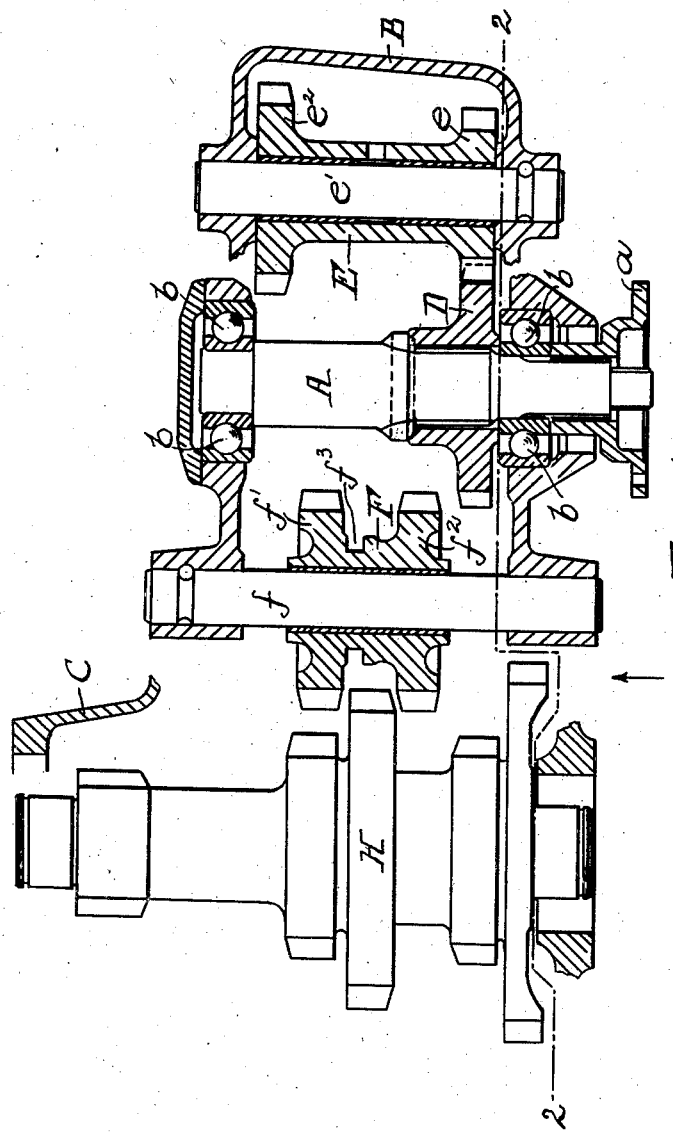

Nov. 9, 1948.                    J. C. HAEFELI                    2,453,685
              MEANS FOR TAKING OFF POWER FROM THE DRIVE
                      TRANSMISSION OF MOTOR VEHICLES
Filed July 21, 1945                                        2 Sheets-Sheet 1

Julius Charles Haefeli
                    Inventor,
by Lester L. Sargent

Nov. 9, 1948.  J. C. HAEFELI  2,453,685
MEANS FOR TAKING OFF POWER FROM THE DRIVE
TRANSMISSION OF MOTOR VEHICLES
Filed July 21, 1945  2 Sheets-Sheet 2
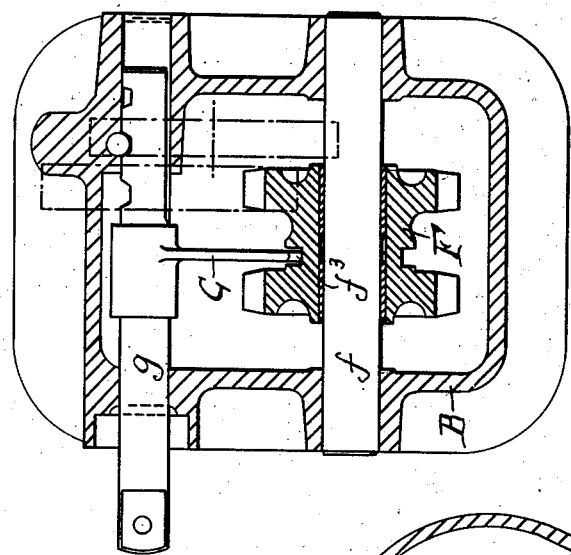
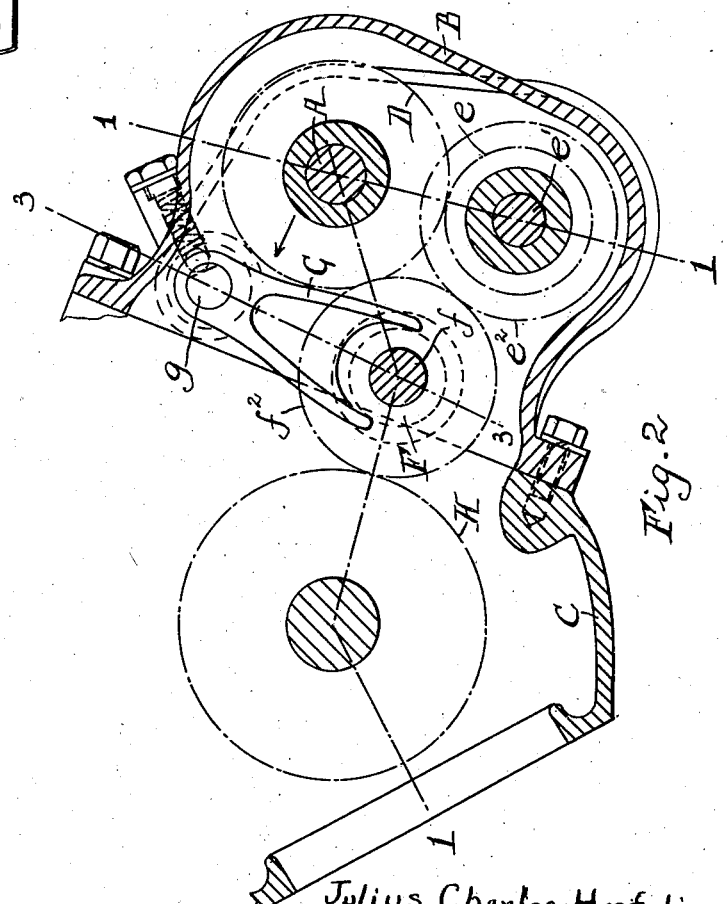
Julius Charles Haefeli,
Inventor,
by Lester L. Sargent
Attorney.

Patented Nov. 9, 1948

2,453,685

UNITED STATES PATENT OFFICE 2,453,685

MEANS FOR TAKING OFF POWER FROM THE DRIVE TRANSMISSION OF MOTOR VEHICLES

Julius Charles Haefeli, Birmingham, England, assignor to The Austin Motor Company Limited, Birmingham, England Application July 21, 1945, Serial No. 606,420
In Great Britain August 7, 1944

3 Claims. (Cl. 74—11)

REISSUED

1

The invention relates to what is known as power take-off in motor vehicles required for which drive and other purposes and has for its object to effect improvements therein.

According to this invention the power is taken from one of the wheels of the change-speed gear and preferably from the speed wheel which is largest in diameter of the lay-shaft and which is usually the third speed wheel. The means comprise a pair of toothed wheels of the same diameter and rigid with a slidable shaft which is preferably in the form of a sleeve with which both wheels are integral. Means are provided to move the shaft endwise so as to bring either of the wheels into engagement with the respective wheel on the lay shaft. Sufficient space is left between the sliding wheels to ensure that the one cannot engage the lay shaft wheel until the other has disengaged.

When one of the wheels on the sliding shaft hereinafter referred to as the first sliding wheel is in engagement with the said lay shaft wheel, the other or second sliding wheel meshes with a gear wheel on the power take-off shaft, whereby drive in one direction is transmitted to it from the lay shaft; and, when the second sliding wheel is slid into engagement with the respective lay shaft wheel, the first sliding wheel engages with a gear wheel on an idle shaft, another gear wheel on the latter being constantly in mesh with a gear wheel on the power take-off shaft, whereby reverse drive is transmitted thereto.

It is desirable that, when the sliding wheels are in neutral position, the side clearance between either wheel and the said lay shaft wheel be arranged to be slightly less than between either sliding wheel and the wheel which it drives, that is to say the wheel on the power take-off shaft or the respective wheel on the idle shaft.

Power may be taken from either or both ends of the power take-off shaft.

The arrangement above described forms a simple and reliable means for driving the power take-off shaft in either direction, or leaving it completely dis-connected; because, when the respective lay shaft wheel is between the two sliding wheels, and therefore disengaged from both of them, the sliding wheels are also out of mesh both with the said wheel on the power take-off shaft and with the respective wheel on the idle shaft, although the latter may remain continually in mesh with the respective wheel on the power take-off shaft.

A convenient embodiment of the invention is described with reference to the accompanying drawings; in which, Figure 1 is a longitudinal sectional plan view of the power take-off means according to the invention, the section being taken in the planes indicated by the irregular line 1, 1, of Figure 2.

Figure 2 is a section taken in the planes indicated by the irregular line 2, 2, of Figure 1 and looking in the direction of the arrow of that figure; and, Figure 3 is a section taken in the plane indicated by the line 3, 3, of Figure 2; and looking in the direction of the arrow of that figure.

In these drawings, A is the power take-off shaft mounted in bearings $b$, $b$, of a housing B which is bolted to the gear box C of the vehicle. On one end of the shaft A is splined a coupling $a$ to which may be coupled any wheel or other part required to be driven.

Also splined on the shaft A is a spur wheel D which is constantly in mesh with a spur wheel $e$ integral with one end of a hollow shaft E turnably mounted on an arbor $e'$ set in the housing B. Integral with the other end of the hollow shaft E is a second spur wheel $e^2$. All the spur wheels are indicated in Figure 2 by their pitch lines only.

Slidably and turnably mounted on a second arbor $f$, set in the housing B, is a hollow shaft F integral with which are two spur wheels $f'$ and $f^2$ of equal diameter. The shaft F is moved endwise by a fork G mounted on a selector rod $g$ (see Figure 3) and engaging in a groove $f^3$ of the shaft F.

H indicates the third speed wheel of the lay shaft of the gear box.

When the shaft F is moved in the direction contrary to that indicated by the arrow of Figure 1, the wheel $f'$ is brought into mesh with the wheel H and the wheel $f^2$ with the wheel D on the power take-off shaft, whereby the latter is driven if and when the lay-shaft wheel H is rotating.

Assuming that the lay shaft is turning in an anti-clockwise direction as seen in Figure 2, the power take-off shaft will also be turned in an anti-clockwise direction through the wheels $f^2$ and D.

When, however, the shaft F is moved in the direction indicated by the arrow of Figure 1, the wheel $f^2$ will engage with the lay-shaft wheel H and the wheel $f'$ will engage with the wheel $e^2$ of the hollow shaft E, the other wheel $e$ of which is constantly in mesh with the wheel D. As the wheels $f'$ and $f^2$ will be rotating clockwise as before, the wheels $e^z$, $e$, will be rotating anti-clockwise so that the power take-off shaft A will now be driven clockwise or the reverse way.

At the mid position of the shaft F neither of the wheels $f'$ $f^2$ will be in engagement with the wheel H, so that the power take-off shaft and the shaft E will be stationary; the teeth of the wheel H lying between the teeth of the wheels $f'$ and $f^2$; and the spaces between these latter teeth and those of the lay shaft wheel H are arranged to be less than the respective spaces between the wheels $f^2$ and the wheel D and between the wheel $f'$ and the wheel $e^2$. This ensures that the wheels $f'$ and $f^2$ will commence to rotate before they engage respectively with the wheels $e^z$ and D.

A coupling such as $a$ may be provided on the other end of the power take-off shaft A, if desired.

The coupling $a$ may be fitted to the other end of the shaft A or there may be a coupling at each end. One end, preferably the end nearest to the engine, may be coupled to a governor controlling the engine speed.

It will be seen from the drawings that the wheel $e^2$ is greater in diameter than the wheel $e$ so that, when drive is transmitted through these wheels, the speed of the power take-off shaft is less than when it is driven directly by the wheel $f^2$ engaging with the wheel D.

The power take-off shaft can be utilized either when the vehicle is running or when it is stationary with the engine running.

Having fully described my invention, what I claim and desire to secure by Letters Patent is:

1. Means for taking off power from the drive transmission of a motor vehicle, said means comprising an endwise slidable sleeve, a pair of toothed wheels of the same diameter rigid with said sleeve, means for moving said sleeve endwise, a lay shaft wheel of the change-speed gear of the vehicle with which either of said slidable wheels is engageable, a power take-off shaft, a toothed wheel of said power take-off shaft with which the second of said slidable wheels engages when the first slidable wheel engages said lay shaft wheel, an intermediate shaft, a rotatable sleeve mounted upon said intermediate shaft, a first toothed wheel rigid with said rotatable sleeve with which the first of said slidable wheels engages when the second of said slidable wheels engages with said lay shaft wheel, and a second toothed wheel rigid with said rotatable sleeve and in constant mesh with the said toothed wheel of the power take-off shaft.

2. Means for taking off power from the drive transmission of a motor vehicle, said means comprising a pair of slidable toothed wheels of the same diameter, means for integrally connecting said wheels, means for moving said wheels in an axial direction, a lay shaft wheel of the change-speed gear of the vehicle, with which either of said slidable wheels is engageable, a power take-off shaft, a toothed wheel of said power take-off shaft with which the second of said slidable wheels engages when the first slidable wheel engages said lay shaft wheel, an intermediate shaft, a rotatable sleeve mounted upon said intermediate shaft, a first toothed wheel rigid with said rotatable sleeve, with which the first of said slidable wheels engages when the second of said slidable wheels engages with said lay shaft wheel, and a second toothed wheel rigid with said rotatable sleeve and in constant mesh with the said toothed wheel of the power take-off shaft.

3. Means for taking off power from the drive transmission of a motor vehicle, said means comprising an endwise slidable sleeve, a pair of toothed wheels of the same diameter rigid with said sleeve, means for moving said sleeve endwise, a lay shaft wheel of the change-speed gear of the vehicle, with which either of said slidable wheels is engageable, a power take-off shaft, a toothed wheel of said power take-off shaft with which the second of said slidable wheels engages when the first slidable wheel engages said lay shaft wheel, an intermediate shaft, a rotatable sleeve mounted upon said intermediate shaft, a first toothed wheel rigid with said rotatable sleeve and with which the first of said slidable wheels engages when the second of said slidable wheels engages with said lay shaft wheel, a second toothed wheel rigid with said rotatable sleeve and in constant mesh with the said toothed wheel of the power take-off shaft, and a housing in which said power take-off shaft, said slidable shaft, and said intermediate shaft are mounted, a casing for the transmission and said housing being bolted to said casing.

JULIUS CHARLES HAEFELI.

REFERENCES CITED

The following references are of record in the file of this patent:

UNITED STATES PATENTS

| Number | Name | Date |
|---|---|---|
| 1,756,123 | Jarrett et al. | Apr. 29, 1930 |
| 2,100,677 | Wagner | Nov. 30, 1937 |
| 2,306,767 | Wagner | Dec. 29, 1942 |

FOREIGN PATENTS

| Number | Country | Date |
|---|---|---|
| 464,848 | Germany | Aug. 28, 1928 |